US006885779B2

(12) United States Patent
Keys et al.

(10) Patent No.: US 6,885,779 B2
(45) Date of Patent: Apr. 26, 2005

(54) PHASE MODULATOR WITH TERAHERTZ OPTICAL BANDWIDTH FORMED BY MULTI-LAYERED DIELECTRIC STACK

(75) Inventors: Andrew S. Keys, Harvest, AL (US); Richard L Fork, Madison, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 437 days.

(21) Appl. No.: 09/877,801

(22) Filed: Jun. 6, 2001

(65) Prior Publication Data

US 2003/0035610 A1 Feb. 20, 2003

(51) Int. Cl.[7] ............................ G02F 1/035; G02F 1/01; G02B 6/35
(52) U.S. Cl. ............................ 385/2; 385/16; 359/240
(58) Field of Search .......................... 385/16, 122, 14, 385/2; 359/240, 248, 245–247, 251, 260, 263, 586–589; 250/214 C

(56) References Cited

U.S. PATENT DOCUMENTS

| 5,321,253 A | * | 6/1994 | Gorfinkel et al. ....... 250/214 C |
| 5,751,466 A | | 5/1998 | Dowling et al. |
| 5,907,427 A | | 5/1999 | Scalora et al. |
| 6,028,693 A | * | 2/2000 | Fork et al. .................. 359/248 |

OTHER PUBLICATIONS

Keys, Andrew S., Fork, Richard L., Full cycle, low loss, low distortion phase modulation from multilayered dielectric stacks with terahertz optical bandwidth; Optics Express, the International Journal of Optics; Oct. 23, 2000; vol. 7, No. 9; Optical Society of America, Washington, D.C.

Scalora, M., Dowling, J.P., Bowden, C.M., & Bloemer, M.J., "Optical Limiting and Switching of Ultrashort Pulses in Nonlinear Photonic Band Gap Materials," Phys. Rev. Letter vol. 73, #10, pp. 1368–1371 (1994).

Keys, Andrew S., Fork, Richard L., Nelson, Jr., Thomas R., Loehr, John P., "Resonant Transmissive Modulator Construction for use in Beam Steering Array," Optical Scanning: Design and Application, Jul. 1999, pp. 115–125, SPIE vol. 3787, Denver, CO.

* cited by examiner

Primary Examiner—Brian Healy
Assistant Examiner—Michael P. Mooney
(74) Attorney, Agent, or Firm—James J. McGroary; Ross F. Hunt, Jr.

(57) ABSTRACT

An optical phase modulator includes a bandpass multilayer stack, formed by a plurality of dielectric layers, preferably of GaAs and AlAs, and having a transmission function related to the refractive index of the layers of the stack, for receiving an optical input signal to be phase modulated. A phase modulator device produces a nonmechanical change in the refractive index of each layer of the stack by, e.g., the injection of free carrier, to provide shifting of the transmission function so as to produce phase modulation of the optical input signal and to thereby produce a phase modulated output signal.

22 Claims, 1 Drawing Sheet

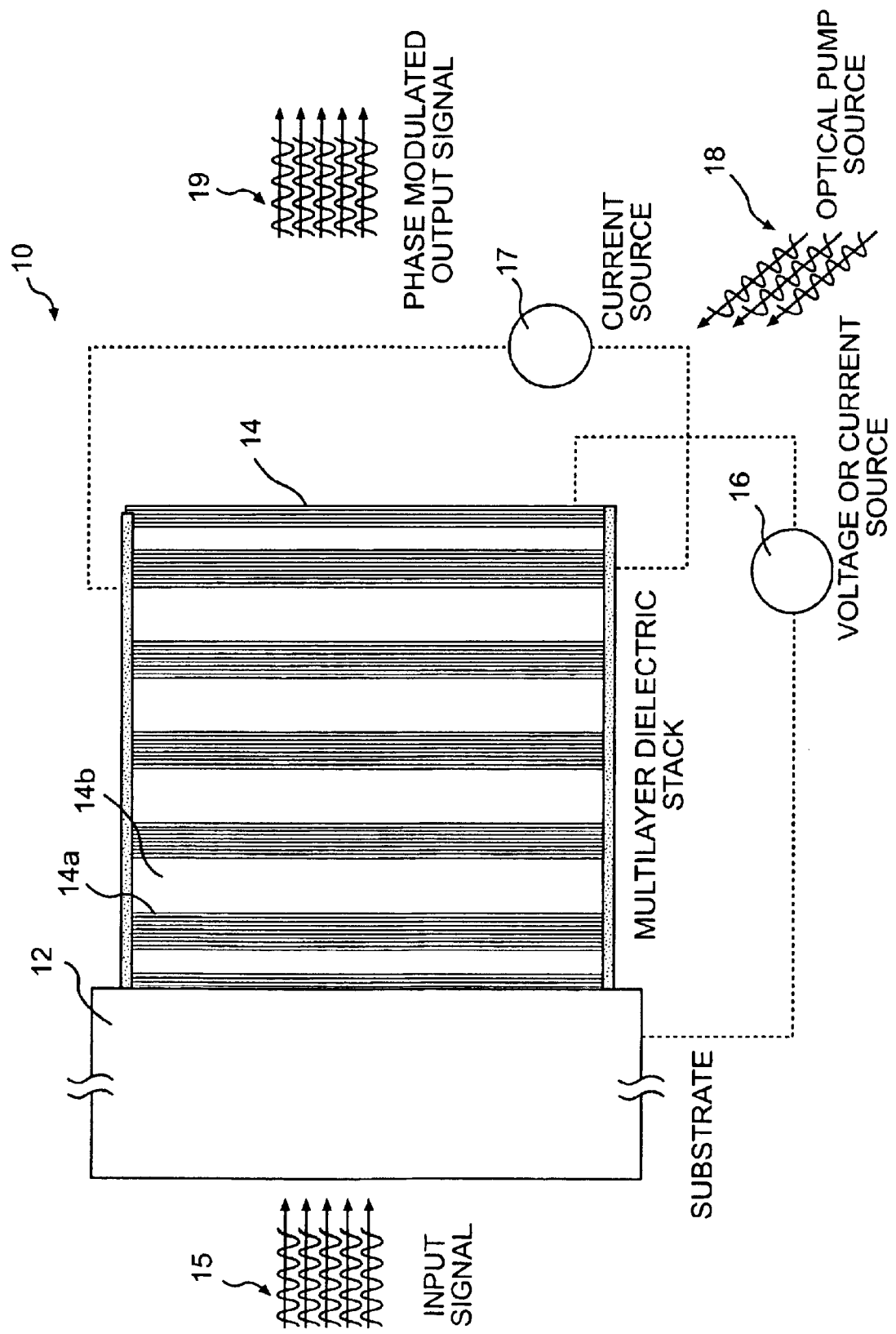

US 6,885,779 B2

PHASE MODULATOR WITH TERAHERTZ OPTICAL BANDWIDTH FORMED BY MULTI-LAYERED DIELECTRIC STACK

ORIGIN OF THE INVENTION

The invention described herein was made by employees of the United States Government and may be manufactured and used by or for the Government for Government purposes without the payment of any royalties thereon or therefore.

BACKGROUND OF THE INVENTION

1. Field of the Invention

The present invention relates to optical phase modulators and, more particularly, to an optical phase modulator comprising a multi-layered dielectric stack configuration, with a terahertz signal bandwidth, capable of providing up to a full cycle of phase modulation in a nearly uniform manner for all contributing frequency components of transmitted optical signals.

2. Description of the Related Art

The use of optical signals for efficient power transmission and data conveyance across the extreme distances associated with the space environment is a highly desirable, yet elusive, capability. Advanced ultra-high-resolution applications, such as optical power beaming, interplanetary optical communication links, and extrasolar planetary imaging, could benefit from long-haul, free-space optical signal transport and detection. Common to these applications is the requirement for optical transmitters or receivers with large aperture baselines capable of maintaining wavefront coherency through active means.

As a quantification of the large aperture sizes required by these optical systems, reference is made to the case of NASA's Terrestrial Planet Finder (TPF) program. Typical TPF program concept descriptions specify a nullifying interferometric telescope configuration using free-flying collector elements to create a sparsely filled optical aperture baseline of up to one kilometer, providing a maximum angular resolution of 0.75 milliarcseconds at a wavelength of 3 μm. Imaging an extrasolar planet, rather than simply detecting it, requires even larger aperture baselines. As a comparative reference, the Hubble Space Telescope has a filled aperture of only 2.4 m in diameter. The next iteration, referred to as Next Generation Space Telescope, and currently slated for launch during the 2009 time frame, is planned to have a quasi-filled aperture diameter of 8 m.

The creation and deployment of such large optical apertures is extremely challenging. Not only must the aperture be of the appropriate diameter to satisfy resolution requirements, but it must also actively maintain wavefront coherency across the entire aperture area. For small optical systems with filled apertures, this requirement tends to be achievable through the serial alignment of conventional optical elements along and near the optical axis of the system. However, as the primary aperture and beam diameter increases, the ability to maintain required wavefront coherency across the filled lateral aperture area using traditional in-line optical elements becomes increasingly difficult.

The spatial segmentation of a large primary aperture into some optimal number of smaller aperture elements provides a useful approach to implementing large aperture systems. The segmentation strategy is particularly favorable for optical amplifier applications because it allows many smaller individual amplifiers to collectively create a large, scalable, effective aperture area of high average power. Aperture segmentation also eases the limiting factors associated with the space-based deployment and configuration of a single large filled aperture.

Segmentation does not, however, fully address issues associated with the maintenance of wavefront coherency and baseline configuration control across the aggregate lateral aperture area. Each segment in an aperture array must implement active correction of local wavefront phase variations in response to measurements taken from some full aperture reference field. By requiring each segment to modulate its local wavefront phase value to match a reference value, the array of individual segments may collectively create a single coherent wavefront of large beam diameter.

To be a viable approach for use in optical applications of transmissive geometry, the local wavefront correction technique implementation should have a rapid response, with a reaction time that is shorter than dynamic vibrational or thermal perturbations of the hosting structure. The correction technique implementation should also provide a relative transmitted phase modulation range of at least a full optical wavelength cycle, allowing for a modulo $2\pi$ correction of axial translations in position that may be any fraction of a wavelength in distance. For applications requiring precision transmission of pulsed power or high rate data, the correction technique implementation should supply a bandwidth wide enough to fully transmit all contributing frequency components of the primary optical signal with low loss and low distortion. Finally, as a major consideration in the design of space-borne systems, the overall mass of the correction technique implementation should be as low as possible, preferably much lower than the mass of state-of-the-art mechanical actuators commonly used to actively correct local figure variations in optical applications of reflective geometry.

Prior art devices used to implement wavefront correction or mirror figure control generally rely on mechanical actuations or nonmechanical devices such as liquid crystal spatial light modulators. It will be appreciated that mechanical actuators have the general disadvantage of being massive and relatively bulky. While other optically based phase modulation techniques may provide phase modulation for a particular frequency, these techniques implement a different level of phase modulation for other nearby frequencies, causing group velocity dispersion in pulses comprising a spectral spread of frequencies. Liquid crystal implementations have switching times that are on the order of milliseconds and are much slower than the bandpass modulation of the invention as described herein below.

SUMMARY OF THE INVENTION

In accordance with the invention, a local wavefront correction approach is provided which employs multi-layered, dielectric stacks as real-time, adjustable broadband phase modulators for pulsed optical signals. In a preferred embodiment, recent advancements in optical interference coating design are used to provide a bandpass configuration with a high average transmission region within which all frequency components of a propagating optical signal may be similarly modulated in phase with low signal loss and low signal distortion. Because the stacked bandpass configuration is compact, lightweight, rapidly configurable, and provides broadband optical phase modulation, the invention provides an enabling technology for active wavefront coherency control in segmented aperture systems.

In accordance with the invention, an optical phase modulator is provided which comprises: a multi-layer, preferably bandpass, stack, comprising a plurality of dielectric layers and having a transmission function related to at least one optical property of the stack, for receiving an optical input signal to be phase modulated; and phase modulator means for producing a nonmechanical change in the at least one optical property of the stack to provide shifting of the transmission function so as to produce phase modulation of the optical input signal and to thereby produce a phase modulated output signal.

Preferably, the at least optical property is refractive index, and the phase modulator means causes a variation in the refractive index of each of the dielectric layers such as to produce the shift in the transmission function. Advantageously, the modulator means decreases the refractive index of the dielectric layers so as to shift the transmission function to shorter wavelengths.

In a preferred implementation, the dielectric layers comprise GaAs and AlAs layers and the decrease in refractive index is preferably between about 0% and 2.0% and, more preferably, about 1.3%. The dielectric layers preferably comprise both layers having a high index of refraction and layers having a low index of refraction. Advantageously, the dielectric layers include alternating GaAs and AlAs layers. In a preferred implementation, layers of relatively thin layers of AlAs are inserted within selected layers of GaAs to smooth the transmission function of the stack. In accordance with a further important feature, the layers of the stack include a plurality of relatively thick layers of GaAs are interspersed at regular intervals within the stack.

In one preferred implementation, the modulation means comprises means for optically generating free carriers to provide phase modulation of the optical input signal. In another embodiment, the layers are dosed with a medium exhibiting a refractive index which varies in a nonlinear manner with optical intensity and the modulator means comprises an optical pump for generating an optical beam which, in combination with the propagating optical input signal, modulates the refractive index of the layers. In an alternative preferred implementation, the modulation means comprises means for externally injecting free carriers to provide phase modulation of the optical input signal. Stated differently, the modulator means comprises free carrier injection means for adjusting free carrier flow laterally across the stack so as to vary the refractive index of the layers. In yet another embodiment, the dielectric layers include GaAs layers, at least one quantum well is created within each GaAs layer and the modulation means comprises means for applying an electric field to the layers of the stack to provide the requisite modulation.

Further features and advantages of the present invention will be set forth in, or apparent from, the detailed description of preferred embodiments thereof which follows.

BRIEF DESCRIPTION OF THE DRAWINGS

The single FIGURE in the drawings is a highly schematic representation, partially in block form, of a phase modulator in accordance with the invention.

DESCRIPTION OF THE PREFERRED EMBODIMENTS

Referring to the single FIGURE of the drawings, there is shown, in generalized form, the basic implementations of a phase modulator which is generally denoted 10 in accordance with a preferred embodiment of the invention. The modulator 10 includes a substrate 12 disposed so as to receive an input signal, as shown at 15, and a multi-layered dielectric stack 14 including separate layers indicated schematically at 14a and 14b. The substrate 12 forms an interface with the first layer of the stack 14 while air forms an interface with the last layer. A phase modulation technique is utilized to modulate the phase of the transmitted output signal. In one embodiment a controllable voltage source 16 is connected between the last layer of the stack 14 and the substrate 12. Another embodiment connects a controllable current source 17 between each side of the stack 14 allowing externally injected free carriers or current to flow laterally across each layer or, connects a controllable current source 16 between the last layer of the stack 14 and the substrate 12 allowing externally injected free carriers or current to flow normal to each layer. Yet another embodiment uses an external optical pump 18 to cause a modulation of the optical properties of the stack 14 in such a fashion as to modulate the transmitted signal. As described in more detail below, a controllable external source induces phase modulation using optically generated free carriers, or an applied electric field on embedded quantum wells. Whatever the modulation approach, the purpose is to provide modulation of the input signal and produce the phase modulated output signal shown at 19.

Before considering the invention in more detail, the terms phase velocity, relative phase modulation, and group velocity in terms of wavelength will be defined for use in assessing the optical interference coating configurations described below. The multilayered stack configurations mentioned above and described below are dispersive in nature and may be described as a function of wavenumber by a generalized dispersion function, $\omega(k)$. Using a Taylor series expansion about a defined central wavenumber value $k_0$, the following expression for the dispersion function is obtained:

$$\omega(k) = (\omega)_0 + \left(\frac{d\omega}{dk}\right)_0 (k - k_0) + \left(\frac{d^2\omega}{dk^2}\right)_0 \frac{(k - k_0)^2}{2!} + \cdots + \left(\frac{d^n\omega}{dk^n}\right)_0 \frac{(k - k_0)^n}{n!} + \cdots. \quad (1)$$

The first term in the expansion determines the phase velocity for the pulse's central wavenumber. The phase velocity for any particular free-space wavenumber k, or free-space wavelength $\lambda$, is $$v_p = \frac{\omega}{k} = \frac{\Delta\phi}{\Delta t} \cdot \frac{\lambda}{2\pi n_{eff}} \quad (2)$$

where $\Delta\phi$ is interpreted with respect to $\lambda$ as the absolute change in phase accumulated within some specified amount of time, $\Delta t$. The overall effective refractive index of the multilayered dielectric stack through which the wavefront propagates is $n_{eff}$. The term $\Delta d$ is defined as the path length traveled by the propagating wavefront. By substituting $\Delta d/V_p$ for $\Delta t$, and rearranging the equation, the following expression is the absolute change in transmitted signal phase in terms of the structure's effective refractive index is obtained:

$$\Delta\phi = \frac{\Delta d 2\pi n_{eff}}{\lambda}. \quad (3)$$

Modulation of either $n_{eff}$ or $\Delta d$ results in a modulation of the absolute change in signal phase. The relative phase modulation is obtained by taking the difference between the unmodulated absolute change in phase and the modulated absolute change in phase.

If it is assumed that the optical signal to be a pulse with a central wavenumber $k_0$, then the group velocity is $$v_g = \left(\frac{d\omega}{dk}\right)_0 = \frac{d}{dk}(k_0(v_p)_0) = (v_p)_0 + k_0\left(\frac{d(v_p)_0}{dk}\right). \quad (4)$$

This expression is valid only if the pulse envelope is sharply peaked at $k_0$ and the dispersion function is smoothly varying around $k_0$. The analysis here is restricted to this case.

Using $k = 2\pi/\lambda$, and $dk = (-2\pi/\lambda^2)d\lambda$, to express the group velocity in terms of the phase velocity at the central wavelength, the expression becomes:

$$v_g = (v_p)_0 - \lambda_0 \left(\frac{d(v_p)_0}{d\lambda}\right). \quad (5)$$

By designing interference coating configurations that increase the rate with which transmitted signal phase changes with respect to wavelength, the group velocity is reduced. This creates not only a desirable region for phase modulation, but also a mechanism for introducing a known amount of group delay to transmitted signals.

The next higher order term in the dispersion function expansion, $d^2\omega/dk^2$, describes the group velocity dispersion. Higher order terms within the expansion introduce pulse distortions, which are usually undesirable for the purpose of transmitting optical signals with low envelope shape distortion. For maximum effectiveness in phase modulation, multilayer stack constructions should be used that possess regions of maximized transmission, reduced group velocity, minimized group velocity dispersion, and minimized higher order terms in the dispersion expansion.

One approach to implementing the multilayer stack 14 of the drawings is through the use of a Distributed Bragg Reflector (DBR) design prescription, although, as will be discussed this implementation is less preferred. In this regard, the narrow, sharply peaked transmission resonance regions found within the DBR's transmission function restrict the bandwidth available to frequency components of short optical pulses. Additionally, the phase component of the DBR's transmission function does not vary linearly with wavelength within the transmission resonance regions, causing group velocity dispersion within these regions.

The DBR is widely used to provide a high level of reflectivity for a band of wavelengths centered about a selected free-space design wavelength, $\lambda_0$. In its simplest implementation, this structure comprises periods of alternating layers of high and low refractive index materials and thicknesses described by $n_1 d_1 = n_2 d_2 = \lambda_0/4$, where $n_{1,2}$ are the respective high and low refractive indices of the dielectric materials, $d_{1,2}$ are the physical layer thicknesses, and $\lambda_0$ is the stack's design wavelength.

The DBR interference coating configuration not only exhibits periodic regions of high reflectivity, but also exhibits resonance regions of high transmissivity. The bandwidth of these transmission resonances is dependent on the values of the layers' refractive indices and the total number of layers within the stack.

Considering an exemplary DBR comprising a 100-layer stack of alternating GaAs and AlAs layers (corresponding to layers 14a and 14b) on a GaAs substrate (corresponding to substrate 12), the stack design may be described by the expression $$S|(LH)^{50}|A \quad (6)$$

where S represents the interface to the GaAs stack substrate, L represents an AlAs layer with an optical thickness of $\lambda_0/4n_L$, H represents a GaAs layer with an optical thickness of $\lambda_0/4n_H$, and A represents the air interface. The exponent notation implies a repeating period of layers. Dispersion is accounted for through formulas describing the wavelength-dependent refractive indices of GaAs and AlAs.

With such a stack, the transmitted relative phase function changes rapidly with respect to wavelength within the regions of high transmission. This rapid change is most pronounced within the transmission resonances on either side of the reflective bandgap. Here the ability to modulate the phase of the transmitted signal is maximized.

It will be seen from the foregoing that the use of the DBR configuration as a phase modulator requires a trade off between maximizing phase modulation and maximizing transmission bandwidth. The transmission resonances in a DBR's transmission function are narrow in width and rounded near the resonance peak, with rapid transmission fall-off on either side. This narrow resonance shape prevents typical DBR stacks from transmitting wideband, short-pulsed optical signals with low distortion.

Modulation of the optical signal as transmitted by the DBR configuration can be accomplished by actively shifting the DBR's complex transmission function relative to the transmitted signal. The DBR stack configuration's capability for modulating narrow band signals can be assured by computationally modeling the result of electrorefractive changes within the stack.

One method of modulating the position of the DBR's transmission function with respect to the transmitted signal wavelength is through the inclusion of one or more quantum wells within each layer of GaAs. This quantum confinement within the GaAs layers allows the formation of an excitonic absorption peak near the GaAs absorption band edge and provides stability for the excitons against ionization in the presence of an electric field. When applied perpendicularly to the stack's layers, an electric field broadens and shifts the excitonic absorption peak to longer wavelengths. This effect, known as the Quantum Confined Stark Effect (QCSE), modulates absorption of wavelengths near the absorption peak. Changes in absorption translate into changes in refractive index as described by Kramers-Kronig relations.

The phase modulation applied to the transmitted optical signal depends on the location of the excitonic absorption peak in relation to the center wavelength of the optical signal. The absorption peak must be near enough to the center wavelength of the transmitted optical signal to benefit from the field-induced refractive index changes, yet not so near as to incur undesirable absorption.

Considering an example wherein the DBR stack is modulated using a 100 kV/cm electric field applied perpendicular to the 100-layer DBR stack, a maximum phase modulation of 2.8803 radians is provided for a center wavelength of 1055.1 nm. This level of modulation is obtained at a significant cost in spectral variation of the transmitted signal amplitude. The transmitted amplitude ranges from 65% of the initial input signal when no modulation is applied, through 92% near the mid-modulation point, and then to 43% at full modulation. For most applications, this large range of amplitude variation is not acceptable.

Previous modeling efforts show that the range of phase modulation obtainable from a multilayered dielectric stack may be further improved by using computationally optimized stack designs derived from initial DBR configurations to narrow the operational transmission resonance. This solution increases the rate with which phase changes with respect to wavelength, but does so by a further reduction in bandwidth to the already narrow transmission resonance used for optical signal transmission.

In the embodiment described above, three performance improvement factors are applied to the initial DBR configuration, viz., inclusion of up to three quantum wells per GaAs layer rather than only one, careful selection of the operational center wavelength of the transmitted signal with respect to the exciton absorption peak induced by the quantum wells, and optimization of the overall stack design to narrow the operational transmission resonance thereby increasing the rate with which the phase changes with respect to wavelength. However, even with these performance improvement factors, the DBR configuration is of limited usefulness for transmitting phase modulated optical signals with broad signal spectrums. The narrow transmission resonance bandwidth and the transmitted amplitude variations occurring during signal modulation prevent the DBR configuration from transmitting broadband optical signals with low distortion.

Because of this deficiency of the DBR configuration, the present invention is principally concerned with alternative multilayered stack configurations that exhibit broadband signal transmission regions with a corresponding phase-to-wavelength function capable of supporting full-cycle phase modulation for a select band of wavelengths.

Turning to a preferred embodiment of the invention, there is provided an alternative multilayer dielectric stack construction for an interference coating that addresses many of the limitations intrinsic to the DBR configuration. The bandpass modulator configuration of this embodiment exhibits a near-uniform phase modulation across a much wider bandwidth than the DBR configuration. The bandpass modulator of this preferred embodiment also maintains a high average transmission across the bandpass region, whereas, as discussed above, the DBR configuration exhibits rapid transmission fall off on either side of the resonance peak. Using the same notation introduced by Eq. (6), an exemplary 79-layer bandpass multilayer stack configuration can be described by the expression:

$$S|HLHLHLH\ (9HLHLHLHLHLHLHL9H)^5\ HLHLHLH|A \quad (7)$$

where 9H represents a GaAs "defect" layer that is nine times the thickness of a regular quarter-wave layer. Unlike the periodic quarter-wave layer configuration of the DBR represented in Eq. (6), the initial bandpass configuration of Eq. (7) includes several thick defect layers interspersed at regular intervals within the stack construction. Again, S would correspond to substrate 12 of the drawings and the various layers would correspond to the layers of stack 14, with the final layer interfacing with air. These defect layers act to create a family of new transmission resonances within the reflective region of the DBR where transmission was previously forbidden. These resonances blend to form a transmitting bandpass region centered about the design wavelength. As with the DBR example, the bandpass configuration can be implemented using a GaAs substrate with layers of GaAs as the high refractive index material and AlAs as low refractive index material.

This initial bandpass configuration described above possesses a transmission region with the transmission ranging between 93.00 and 100.00 percent. The rippling peak-to-valley variations of the transmission region may be reduced further through computational optimization. An optimization technique, referred to as "needling," is preferably employed to strategically insert 10 nm thick layers of AlAs within specific layers of GaAs at specific locations such that the average transmission level across the width of the bandpass is improved. This incremental process results in a much smoother transmission function across the bandwidth of the bandpass configuration bandwidth ranging between 96.85 and 100.00 percent. In the specific example under consideration, this optimization process converted the initial configuration of 79 layers into a final configuration of 91 layers by splitting six layers of GaAs with thin layers of AlAs. It is emphasized that this improved construction is still not globally optimal, but illustrates the value of using the bandpass configuration of this embodiment as a transmission phase modulator.

A specific example of the 91 layer stack including the physical thickness of each of the layers is set forth below:

| GaAs Substrate | | | |
|---|---|---|---|
| 1. | 30.00 nm GaAs | 46. | 84.82 nm AlAs |
| 2. | 10.00 nm AlAs | 47. | 71.67 nm GaAs |
| 3. | 31.67 nm GaAs | 48. | 84.82 nm AlAs |
| 4. | 84.82 nm AlAs | 49. | 71.67 nm GaAs |
| 5. | 71.67 nm GaAs | 50. | 84.82 nm AlAs |
| 6. | 84.82 nm AlAs | 51. | 71.67 nm GaAs |
| 7. | 71.67 nm GaAs | 52. | 84.82 nm AlAs |
| 8. | 84.83 nm AlAs | 53. | 71.67 nm GaAs |
| 9. | 71.67 nm GaAs | 54. | 84.82 nm AlAs |
| 10. | 84.82 nm AlAs | 55. | 71.67 nm GaAs |
| 11. | 510.00 nm GaAs | 56. | 84.82 nm AlAs |
| 12. | 10.00 nm AlAs | 57. | 71.67 nm GaAs |
| 13. | 340.09 nm GaAs | 58. | 84.82 nm AlAs |
| 14. | 84.82 nm AlAs | 59. | 1576.84 nm GaAs |
| 15. | 71.67 nm GaAs | 60. | 84.82 nm AlAs |
| 16. | 84.82 nm AlAs | 61. | 10.00 nm GaAs |
| 17. | 71.67 nm GaAs | 62. | 10.00 nm AlAs |
| 18. | 84.82 nm AlAs | 63. | 51.67 nm GaAs |
| 19. | 71.67 nm GaAs | 64. | 84.82 nm AlAs |
| 20. | 84.82 nm AlAs | 65. | 71.67 nm GaAs |
| 21. | 71.67 nm GaAs | 66. | 84.82 nm AlAs |
| 22. | 84.82 nm AlAs | 67. | 71.67 nm GaAs |
| 23. | 40.00 nm GaAs | 68. | 84.82 nm AlAs |
| 24. | 10.00 nm AlAs | 69. | 71.67 nm GaAs |
| 25. | 21.67 nm GaAs | 70. | 84.82 nm AlAs |
| 26. | 84.82 nm AlAs | 71. | 71.67 nm GaAs |
| 27. | 71.67 nm GaAs | 72. | 84.82 nm AlAs |
| 28. | 84.82 nm AlAs | 73. | 71.67 nm GaAs |
| 29. | 1576.84 nm GaAs | 74. | 84.82 nm AlAs |
| 30. | 84.82 nm AlAs | 75. | 1576.84 nm GaAs |
| 31. | 71.67 nm GaAs | 76. | 84.82 nm AlAs |
| 32. | 84.82 nm AlAs | 77. | 71.67 nm GaAs |
| 33. | 71.67 nm GaAs | 78. | 84.82 nm AlAs |
| 34. | 84.82 nm AlAs | 79. | 71.67 nm GaAs |
| 35. | 71.67 nm GaAs | 80. | 84.82 nm AlAs |
| 36. | 84.82 nm AlAs | 81. | 30.00 nm GaAs |
| 37. | 71.67 nm GaAs | 82. | 10.00 nm AlAs |
| 38. | 84.82 nm AlAs | 83. | 31.67 nm GaAs |
| 39. | 71.67 nm GaAs | 84. | 84.82 nm AlAs |
| 40. | 84.42 nm AlAs | 85. | 71.67 nm GaAs |
| 41. | 71.67 nm GaAs | 86. | 84.82 nm AlAs |
| 42. | 84.82 nm AlAs | 87. | 71.67 nm GaAs |
| 43. | 1480.00 nm GaAs | 88. | 84.82 nm AlAs |
| 44. | 10.00 nm AlAs | 89. | 71.67 nm GaAs |
| 45. | 86.84 nm GaAs | 90. | 84.82 nm AlAs |
| | | 91. | 1003.44 nm GaAs |
| | | | Air Interface |

At normal incidence, the bandpass configuration exhibits a bandpass region of ~21.0 nm, or ~6.3 THz, in bandwidth, and has an edge-to-edge phase change of 2.08 full cycles, slightly greater than $4\pi$ radians. This large edge-to-edge relative phase difference allows access to essentially any level of relative phase modulation.

Considering a specific example, an optical signal is defined with a gaussian amplitude envelope, a center wavelength of 993.3 nm, and a root-mean-square (rms) width of 5 nm, corresponding to a pulse length of 52 fs. Selection of these parameters intentionally positions the rms bandwidth of the signal within the shorter wavelength half of the bandpass region. The center wavelength of the signal is selected as 993.3 nm to correspond with the peak of the second transmission resonance ripple within the bandpass.

By defining the optical signal bandwidth to be less than half of the transmission bandwidth, access is provided to a full cycle of phase modulation without adversely affecting signal transmission levels. Appropriate modulation of the optical characteristics of the stack causes the transmission function to shift in spectral position relative to the optical signal. This shift translates the transmission function across the spectral bandwidth of the signal, effectively causing the spectral position of the signal to migrate from one half of the full transmission bandpass region to the other half. This translation of the transmission function with respect to the bandwidth of the optical signal brings all signal frequency components through a complete cycle of phase modulation. Important to the successful implementation of this phase modulation approach is the requirement that the technique used to shift the transmission function in wavelength space does so in a uniform fashion.

It has been found through simulation for the example under consideration that a 1.3 percent reduction in refractive index values for all GaAs and AlAs layers accesses a full cycle phase modulation. Increasing the refractive indices by a similar amount shifts the transmission function bandpass region to longer wavelengths, moving the transmission bandpass region away from the spectral bandwidth of the signal rather than across this bandwidth. This shift translates the transmission function such that the spectral components of the signal experience a transition from a region of high transmissivity to a region of high reflectivity. This change in transmission level has the effect of providing an optical switch configuration for the optical signal.

Turning again to the modulation techniques that may be employed in accordance with the present invention, one mentioned above is free carrier injection. In this regard, free carrier injection provides a direct method for changing the refractive index of semiconductor materials which make up the stack layers. Adjusting the flow of free carriers through the stack varies the semiconductor refractive index, resulting in a shift of the position of the transmission function with respect to wavelength. This modulation technique is a preferred technique for the implementation of a non-mechanically induced change in the optical characteristics of the constituent dielectric materials of the multilayer stack. The injection of free carriers into a forward biased stack causes semiconductor bandfilling, band-gap shrinkage, and free-carrier absorption within the semiconductors, all of which contribute cumulatively to a change in refractive index. At a photon energy of 1.2 eV (1033 nm), GaAs experiences a negative change in refractive index of about one percent in response to the introduction of a free carrier concentration of $\sim 2\times 10^{18}/cm^3$. A similar change would be expected for AlAs. Because the absorption band edge of AlAs occurs at a shorter wavelength than that of GaAs, the refractive index of AlAs will not change at the same rate or level as that of GaAs in response to a specific free carrier concentration. It is noted that care should be exercised in using this method of modulation to keep the rate and level of refractive index change in both semiconductors (GaAs and AlAs) as similar as possible. Departures from a similar level of refractive index change can contribute to transmission function figure distortion, causing an exaggeration of the ripples found within the transmission region and resulting distortion of the transmitted signal.

The effect of the field-induced QCSE as applied to the modulation of an optical signal transmitted by the DBR configuration has been briefly discussed above and can also be used. This approach to signal modulation produces localized changes in the refractive index of GaAs layers of the stack by slightly increasing the value of the index within the quantum confined region. Estimates of switching times for field-effect, multilayered devices similar to the modulator configuration being described here are on the order of several hundred picoseconds, with this speed being limited primarily by the resistance capacitance (RC) time constant of the individual element. This electrorefractive approach provides, at best, only a few nanometers of shift in the transmission function, resulting in only a fraction of the desired full-cycle phase modulation. Further, because the quantum wells are local to only the GaAs layers, the QCSE tends to modify the optical characteristics of the stack in a nonsymmetrical fashion, deforming the carefully optimized figure of the transmission function and causing distortion in the transmitted optical signal. Asymmetric quantum well construction provides improved refractive index modulation, but is still a phenomenon localized to only the GaAs layers.

Another candidate modulation technique providing the requisite refractive index change involves doping the semiconductor materials with a medium that exhibits a refractive index nonlinearity in response to optical intensity. This technique allows the refractive index of the layers of the stack to be modulated through the combination of an optical pump beam and the propagating optical signal. Implementation of this modulation technique requires a similar nonlinearity in both materials within the stack. The doping of only one of the two materials within a DBR configuration to produce an optical limiting switch near the reflective bandgap has been suggested (see M. Scalora, J. P. Dowling, C. M. Bowden, and M. J. Bloemer, "Optical Limiting and Switching of Ultrashort Pulses in Nonlinear Photonic Band Gap Materials," *Phys. Rev. Lett.* 73, 1368–1371 (1994)) for use in the implementation of an optical switch, but this does not maintain the required balance of refractive index change in both materials. An imbalance of refractive index change results in the deformation of the transmission function figure and distortion of the transmitted signal.

For purposes of discussion, an examination will be made of the relationship of the transmission function to the angle of incidence of the transmitted optical signal. As the angle of incidence increases, the optical thickness of the layers of the stack as experienced by the propagating signal increases correspondingly. An increase in the angle of incidence provides an approximation to the effects resultant from a uniform change in refractive index throughout layers of the stack. At normal incidence, both p and s polarizations of the optical signal exhibit the same transmission spectrum. Off normal incidence assessments must be made separately for both the p and s polarization states.

By interrogating the structure with an optical signal of p-type polarization, it is found that the center wavelength of the signal is modulated by $\pi$ radians at a 22.60 degree angle of incidence. The signal's center wavelength is modulated by a full $2\pi$ radian cycle at a 33.36 degree angle of incidence. Likewise, by interrogating the structure with an optical signal of s-type polarization, it is found that the center wavelength of the signal is modulated by $\pi$ radians at a 22.66 degree angle of incidence. The center wavelength of the signal is modulated by a full $2\pi$ radian cycle at a 33.00 degree angle of incidence.

Wavelength components on either side of the center wavelength of the signal are modulated by slightly different amounts as compared to the amount of modulation imparted to the center wavelength of the signal, resulting in a "saddle" shape in the phase modulation plots. This wavelength-dependent variation in modulation level reveals the existence of some residual amounts of group velocity dispersion and other higher order phase distortions near the bandwidth region of the signal. Though the process is more computationally demanding, these residual amounts of pulse phase distortion may be attenuated through further computational optimization of the stack design of the bandpass configuration. The same optimization techniques used to create the bandpass region of high average transmission may also be used to develop bandpass configuration designs with reduced levels of phase distortion. Optimization routines generally rely on the evaluation of a defined merit function to determine when design is approaching some local minimum. By using both transmission level and phase distortion as inputs to the merit function of the optimization routine, the optimizer can generate stack design solutions that not only minimize the variations found in the bandpass region of the filter, but that also minimize higher order phase distortions. Further minimization of these undesirable phase distortion terms will flatten out the saddle shape, causing a more uniform phase modulation across the entire signal bandwidth.

The performance of the bandpass configuration of the invention, as predicted above, as a broadband phase modulator compares favorably to commercially available phase modulating products. Operating frequencies of commercial electro-optic phase modulators vary from the MHz range for broadband modulators to the GHz range for resonant, narrowband modulators. Depending on the modulation technique employed, and the final dimensions of the device, the bandpass modulator of the invention could provide broadband modulation rates at least as high as the GHz range. As discussed previously, the bandpass configuration features the additional capability of signal switching, a process that is implemented at the same operating rate as phase modulation.

The interaction length of the optical signal with the dielectric stack is on the order of micrometers as compared to the longer interaction length required of the electro-optic bulk crystal phase modulator, which is on the order of millimeters. Further, because the fabrication techniques used in creating dielectric stacks are compatible with those used to pattern and fabricate microelectronic devices, these broadband phase modulators have potential application as individually controlled elements in densely packed optical arrays (see A. S. Keys, R. L. Fork, T. R. Nelson, Jr., and J. P. Loehr, "Resonant Transmissive Modulator Construction for use in Beam Steering Array," in *Optical Scanning: Design and Application*, L. Beiser, S. F Sagan, G. F Marshall, eds., *Proc. SPIE* 3787, 115–125(1999)). Each modulator within the element array may be configured to impart a specific amount of phase modulation to a transmitted broadband optical signal, providing the means for producing directional optical beam steering.

It is noted that one and two dimensional arrays of modulator elements assembled to provide a means of implementing an active optical device for use in phase front correction and nonmechanical beam steering could benefit from the basic aspects of the invention described above.

It is noted that large segmented aperture systems requiring a lightweight solution to rapid, active, wavefront correction could benefit from the basic aspects of the invention as described above.

Although the invention has been described above in relation to preferred embodiments thereof, it will be understood by those skilled in the art that variations and modifications can be effected in these preferred embodiments without departing from the scope and spirit of the invention.

What is claimed:

1. An optical phase modulator comprising:
   a multilayer stack, comprising a plurality of dielectric layers and having a transmission function related to at least one optical property of the stack, for receiving an optical input signal to be phase modulated; and
   phase modulator means for producing a nonmechanical change in the at least one optical property of the stack to provide shifting of the transmission function to produce phase modulation of the optical input signal and to thereby produce a phase modulated output signal,
   said multilayer stack being disposed perpendicular to the optical signal to be modulated so that the signal passes serially through each dielectric layer of the plurality of dielectric layers and said dielectric layers being of at least three different thicknesses arranged in an aperiodic thickness pattern such that the chase modulator exhibits a near-linear phase modulation over a wide bandwidth.

2. A phase modulator according to claim 1 wherein said multilayer stack comprises a bandpass multilayer stack.

3. A phase modulator according to claim 1 wherein said at least optical property is refractive index, said dielectric layers each have a refractive index value, and said phase modulator means causes a variation in the refractive index of said dielectric layers such as to produce the shift in the transmission function.

4. A phase modulator according to claim 3 wherein said modulator means decreases the refractive index of said dielectric layers so as to shift the transmission function to shorter wavelengths.

5. A phase modulator according to claim 4 wherein said dielectric layers comprise GaAs and AlAs layers and said decrease is between 0% and 2.0%.

6. A phase modulator according to claim 5 wherein said decrease is about 1.3%.

7. A phase modulator according to claim 1 wherein said dielectric layers comprise both layers having a high index of refraction and layers having a low index of refraction.

8. A phase modulator according to claim 1 wherein said dielectric layers include alternating GaAs and AlAs layers.

9. A phase modulator according to claim 8 wherein layers of relatively thin layers of AlAs are inserted within selected layers of GaAs to smooth the transmission function of the stack.

10. A phase modulator according to claim 8 wherein said layers include a plurality of relatively thick layers of GaAs are interspersed at regular intervals within the stack.

11. A phase modulator according to claim 1 wherein said modulation means comprises means for optically generating free carriers to provide phase modulation of the optical input signal.

12. A phase modulator according to claim 3 wherein said modulation means comprises means for optically generating free carriers to provide phase modulation of the optical input signal.

13. A phase modulator according to claim 1 wherein said modulation means comprises means for externally injecting free carriers to provide phase modulation of the optical input signal.

14. A phase modulator according to claim 3 wherein said modulation means comprises free carrier injection means for adjusting free carrier flow through the stack so as to vary the refractive index of the layers.

15. A phase modulator according to claim 3 wherein the layers are dosed with a medium exhibiting of a refractive index which varies in a nonlinear manner with optical intensity and said modulator means comprises an optical pump for generating an optical beam which, in combination with the propagating optical input signal, modulates the refractive index of the layers.

16. A phase modulator according to claim 1 wherein said dielectric layers include GaAs layers, wherein at least one quantum well is created within each GaAs layer and said modulation means comprises means for applying an electric field to the layers of said stack.

17. An optical switch comprising:

a multilayer stack, comprising a plurality of dielectric layers and having a transmission function related to at least one optical property of the stack, for receiving an optical input signal to be phase modulated, said stack including a plurality of alternating layers of two different thicknesses and a plurality of further layers of at least one further thickness interspersed within said plurality of alternating layers; and optical switching means for producing a nonmechanical change in said at least one optical property of the stack to provide shifting of the transmission function to a region of high reflectivity, said multilayer stack being disposed perpendicular to the optical input signal to be phase modulated such that the signal passes serially through each dielectric layer of the plurality of dielectric layers.

18. An optical switch according to claim 17 wherein said at least optical property is refractive index, said dielectric layers each have a refractive index value, and said optical switching means causes an increase in the refractive index of said dielectric layers so as to produce a shift in the transmission function to longer wavelengths.

19. An optical phase modulator comprising:

a multilayer slack, comprising a plurality of dielectric layers and having a transmission function related to at least one optical property of the stack, for receiving an optical input signal to be phase modulated; and phase modulator means for producing a nonmechanical change in the at least one optical property of the stack to provide shifting of the transmission function to produce phase modulation of the optical input signal and to thereby produce a phase modulated output signal, wherein said at least optical property is refractive index, said dielectric layers each have a refractive index value, and said phase modulator means causes a variation in the refractive index of said dielectric layers such as to produce the shift in the transmission function, and wherein said modulator means decreases the refractive index of said dielectric layers so as to shift the transmission function to shorter wavelengths.

20. An optical phase modulator comprising: a multilayer stack, comprising a plurality of dielectric layers and having a transmission function related to at least one optical property of the stack, for receiving an optical input signal to be phase modulated; and phase modulator means for producing a nonmechanical change in the at least one optical property of the stack to provide shifting of the transmission function to produce phase modulation of the optical input signal and to thereby produce a phase modulated output signal, wherein said dielectric layers include GaAs layers of a first thickness and alternating AlAs layers of a second thickness, and further layers of relatively thin layers of AlAs of a different thickness from said second thickness inserted within selected layers of GaAs to smooth the transmission function of the stack.

21. An optical phase modulator comprising:

a multilayer stack, comprising a plurality of dielectric layers and having a transmission function related to at least one optical property of the stack, for receiving an optical input signal to be phase modulated; and phase modulator means for producing a nonmechanical change in the at least one optical property of the stack to provide shifting of the transmission function to produce phase modulation of the optical input signal and to thereby produce a phase modulated output signal.

wherein said dielectric layers include GaAs layers of a first thickness and alternating AlAs layers of a second thickness, and wherein said layers further include a plurality of relatively thick layers of GaAs of a thickness greater than said first thickness interspersed at regular intervals within the stack.

22. An optical phase modulator comprising:

a multilayer stack, comprising a plurality of dielectric layers and having a transmission function related to at least one optical property of the stack, for receiving an optical input signal to be phase modulated, said dielectric layers comprising alternating layers of two different thicknesses and further interspersed layers of at least one further thickness so that said stack comprises an arrangement of said dielectric layers of thickness having an overall non-repeating, aperiodic pattern; and phase modulator means for producing a nonmechanical change in the at least one optical property of the stack to provide shifting of the transmission function to produce phase modulation of the optical input signal and to thereby produce a phase modulated output signal, wherein said at least optical property is refractive index, said dielectric layers each have a refractive index value, and said phase modulator means causes a variation in the refractive index of said dielectric layers such as to produce the shift in the transmission function, wherein said modulation means comprises free carrier injection means for adjusting free carrier flow through the stack so as to vary the refractive index of the layers, and wherein the layers are dosed with a medium exhibiting of a refractive index which varies in a nonlinear manner with optical intensity and said phase modulator means comprises an optical pump for generating an optical beam which, in combination with the propagating optical input signal, modulates the refractive index of the layers.

* * * * *